United States Patent [19]

Konefal

[11] Patent Number: 5,385,466
[45] Date of Patent: Jan. 31, 1995

[54] THERMOPLASTIC CONTAINER INJECTION BLOW MOLDING APPARATUS

[75] Inventor: Robert S. Konefal, Holland, Ohio

[73] Assignee: Owens-Illinois Plastic Products Inc., Toledo, Ohio

[21] Appl. No.: 122,837

[22] Filed: Sep. 16, 1993

[51] Int. Cl.$^6$ ............................................. B29C 49/60
[52] U.S. Cl. .................... 425/522; 425/535; 425/536
[58] Field of Search ................ 425/522, 524, 535, 536

[56] References Cited

U.S. PATENT DOCUMENTS

| | | | |
|---|---|---|---|
| 4,070,141 | 1/1978 | Ryder | 425/535 |
| 4,152,383 | 5/1979 | Ryder | 264/39 |
| 4,162,879 | 7/1979 | Makowski | 425/533 |
| 4,244,913 | 1/1981 | Ryder | 425/535 |

Primary Examiner—Tim Heitbrink

[57] ABSTRACT

A face block (10) for an injection blow molding machine of the type used in producing thermoplastic containers. The face block has a lateral series of openings (14) extending axially therethrough, and each opening receives an end portion of an elongate tubular core rod (16). The core rod has an annular bushing (18) secured to the end portion that is received in the opening, and the opening is sized to permit radial movement of the annular bushing therein to permit the core rod to move relative to the face block. The annular bushing has an annular recess (18a) in an end surface thereof and the recess carries an elastomeric O-ring (20) which sealingly engages an inturned annular flange (14a) at the rear of the opening. The core rod is axially positioned relative to the annular flange to maintain the O-ring in sealing engagement therewith by a U-shaped retainer (22) which is secured to the front of the face block. The retainer has legs (22a, 22b) which engage a recess (16a) in the outside of the core rod. The end of the core rod is radially pre-centered or pre-positioned, and preferably in a resilient manner, within the opening by at least three, and preferably four coil springs (30) carried by screws (28) which are threaded into radial openings (26) extending through the face block around each axially extending opening.

19 Claims, 1 Drawing Sheet

THERMOPLASTIC CONTAINER INJECTION BLOW MOLDING APPARATUS

FIELD OF THE INVENTION

This invention relates to apparatus for producing containers or other hollow objects from a thermoplastic material by an injection blow molding process. More particularly, this invention relates to an improved sealing arrangement between the core rod of the mold tooling used to produce a specific blow molded object, such as a container of a specific size and shape, and the face block of the molding apparatus used to produce containers or other objects in a variety of sizes and shapes.

BACKGROUND OF THE INVENTION

It is known that thermoplastic containers and other hollow objects can be produced by a process known as the injection blow molding process in which closed end, hollow preforms or parisons are produced by an injection molding process at a first station on a rotary molding machine. In this process each preform is injection molded around the exterior of a long, narrow member, which is usually called a core rod. The core rod, or, typically, a multiplicity of like core rods in a multiple cavity molding machine, are inserted into a face block member of a rotary turret of the molding machine, and the rotary turret with the core rods inserted into its face block is indexed, after the parisons are formed on the core rods, to a blow molding station. At the molding station, the parisons, while still at a suitable molding temperature, are blown into the configuration of containers or other hollow objects against the internal surfaces of mating mold sections. In a process of this type, each core rod is hollow, and compressed air for the blowing operation is introduced from the molding machine through the face block into each object being blown through the core rod for that object.

Because of the need to maintain a positive pressure within a container or other object while it is being blown to accomplish the blowing operation, it is necessary to provide a suitable seal between each core rod and an opening in the molding machine face block which receives an end of such core rod. Heretofore, it was customary to effect such seal by inserting an elastomeric O-ring in an annular groove in the inside surface of each core rod receiving opening of the face block. Such an O-ring would then seal against an outside diametral surface of the core rod, and would serve to prevent blowing air leakage from the molding machine through an annular opening between the inside of the face block opening and the outside of the core rod. However, the use of such a seal limits radial movement of the core rod relative to the face block that is, movement transverse to the longitudinal central axis of the core rod, and such radial movement may be desirable to accommodate possible misalignment between the core rod and other elements of the mold tooling during the blowing operation. With the diametral seal against the core rod, as described above, misalignment of the core rod and the mold tooling is accommodated mainly by angular deflection of the core rod about an axis extending through the face block O-ring, that is, about an axis extending transversely of the longitudinal central axis of the core rod. Such angular deflection can be disadvantageous in a container forming operation, however, especially if more than a small degree thereof occurs, because it can lead to excessive and premature wear of the core rods and the bottle finish forming neck rings of the mold tooling, which are moved into close proximity to the core rod during a container blowing operation. Further, in certain situations such core rod angular deflection can lead to undesirable variations in the thickness of the sidewall of a container which is being produced by such tooling.

SUMMARY OF THE INVENTION

According to the present invention there is provided plastic molding apparatus which accommodates substantial radial movement between a face block member of the molding machine and a core rod member, an end of which is inserted into an opening of the face block. Nevertheless, in apparatus according to the present invention a suitable air seal is provided between the face block and the core rod to permit the core rod to be used to transmit pressurized air from the face block to the interior of a heated, thermoplastic preform on the core rod to thereby blow the parison to a desired configuration in a mold.

The core rod receiving opening of the face block of a molding machine according to the present invention is sized to provide substantial radial clearance with respect to the end of the core rod that is received therein, or with respect to a bushing or other annular member that snugly engages the end of the core rod, and is further provided with a radially inwardly projecting annular surface adjacent the end of such core rod. The end surface of the core rod, in turn, or the end surface of a surrounding annular member which is secured to the end of the core rod, is provided with an inwardly extending annular O-ring receiving recess. An elastomeric O-ring is then inserted into such recess. The O-ring is positioned to sealingly engage a planar annular surface of the face block opening when the core rod is inserted into a proper depth within such opening. The depth of the insertion of the core rod into the opening of the face block is controlled by providing the core rod with an inwardly extending recess at a location adjacent the front surface of the face block, when the core rod is inserted into the face block to its proper depth. The core rod is then positively retained in this axial position with respect to the face block by a U-shaped groove in a retainer which is removably affixed to the outwardly facing surface of the face block by threaded fasteners or the like. The U-shaped groove in the retainer engages the diametral groove in the core rod and has sufficient radial clearance with respect to the diametral groove to permit free radial movement between the core rod and the face block, while preventing a degree of axial movement of the core rod with respect to the face block that would result in loss of sealing engagement therebetween.

When it is desired to produce a blow molded container or other object of different dimensions or characteristics, the core rods for the objects being taken out of production can be readily removed by removing the retainer from the outwardly facing surface of the face block and by then replacing the core rods with other core rods appropriately dimensioned and designed for the objects being put into production.

The core rods of the invention of this application can be free floating with respect to the face block openings in which they are received, or each core rod can be adjustably or resiliently centered or otherwise positioned within its face block opening by at least three, and preferably at least four, centering elements. The centering elements extend radially into the face block at locations around its periphery to engage the end of a core rod within a face block opening at spaced apart locations around the core rod end. The use of both rigid and spring mounted positioning elements for this purpose is contemplated.

Accordingly, it is an object of the present invention to provide an improved face block and core rod assembly for use in a machine for producing containers or other objects from a thermoplastic material by an injection blow molding process. More particularly, it is an object of the present invention to produce an assembly of such character in which the core rod is permitted to move radially with respect to the face block within an opening of the face block in which the core rod is inserted, while maintaining a suitable seal between the core rod and the face block to permit pressurized fluid for the blowing process to flow from the face block through the core rod and into the object being blown.

For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
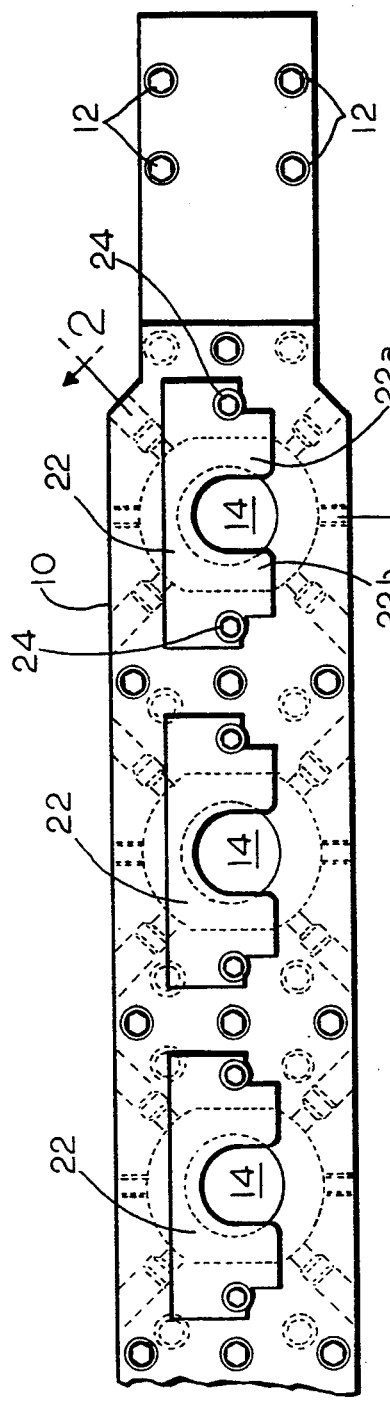
FIG. 1 is a fragmentary elevational view of a face block of an otherwise conventional injection blow molding machine according to a preferred embodiment of the present invention.

Reference numeral 10 is used to identify a face block according to a preferred embodiment of the present invention. The face block 10 typically will extend horizontally and is secured at its opposed ends, only the end 10a being shown, to a rotary turret, not shown, of an otherwise conventional injection blow molding machine. Cap screws 12 are provided at the end 10a to secure it to the molding machine turret.

The face block 10 is provided with one or more, but usually a plurality and often as many as twelve, openings 14 extending therethrough, and each opening is designed to receive an end of an elongate tubular member 16, which is usually referred to as a core rod in molding terminology. A single open ended thermoplastic article, such as a bottle or other type of container, is blow molded around each core rod 16, and the core rod is used to transmit compressed air or other blowing medium from the molding machine turret through the face block 10 to the interior of the article being blow molded around such core rod. Typically, core rods are sized for the specific container to be blow molded therearound, and are changed when it is desired to produce different containers.

For proper operation of a core rod 16, it is necessary to properly seal the juncture between the core rod 16 and the opening 14 of the face block 10 in which it is received against the escape of blowing fluid that is to pass through the core rod. Further, it is also important to provide for some misalignment between the core rod 16 and the face block 10 to accommodate the kinds of misalignments that can, and often do, occur in molding practice between the core rod 16 and the sections of a mold, not shown, which surround and define the shape of an article being blown around such core rod. In the present invention, these dual requirements are met by providing substantial radial clearance between the major inside surface 14a of each opening 14 and the major outside surface of the portion of the core rod 16 that is surrounded thereby, in the illustrated embodiment an outside surface 18a of a bushing 18 that is secured to an end portion of the core rod 16, and by providing an O-ring 20 of an elastomeric or other yieldable material in an annular recess 18b of the bushing 18 and an inturned annular flange 14b at the rear or molding machine adjacent end of each opening 14. Thus, each core rod is free to move radially within its opening 14 to accommodate any required misalignment between the face block 10 and the mold section its opposed end is received in while maintaining the O-ring 20 in sealing engagement with the annular flange 14b to prevent escape of blowing fluid as a result of any such required misalignment.

The proper axial positioning of the core rod 16 relative to the annular flange 14b to maintain sealing engagement between the O-ring 20 and the annular flange 14b is ensured by providing the core rod 16 with an annular groove 16a at a location immediately in front of the face block 10 and by securing a removable U-shaped retainer 22 to the front of the face block 10 by a pair of cap screws 24. The lateral spacing between the opposed legs 22a, 22b of the retainer 22 is less than that of the major outside diameter of the core rod 16 but slightly greater than that of its annular groove 16a. Thus, when the retainer 22 is affixed to the face block 10, with its legs 22a, 22b engaging the annular groove 16a of the core rod 16, the O-ring will be positively and properly positioned to sealingly engage the flange 14b, while still providing sufficient clearance between the legs 22a and 22b and the recess 16a to permit the core rod 16 to move radially with respect to the opening 14.

A core rod 16 can be free floating within an opening 14 or it can be pre-centered therein. If it is desired to pre-center a core rod 16 within an opening 14, the face block 10 is provided with at least three, and preferably four, circumferentially spaced apart and radially aligned threaded positioning openings 26 which are aligned with an end portion of the core rod 16, or the bushing 18 when the core rod 16 is provided with such a bushing. A screw 28, preferably of a type that carries a coil spring 30 at its inner free end, is threaded into each opening 26 to adjustably positively, or resiliently when springs 30 are used, pre-center or radially pre-position the end of the core rod 16 relative to the opening 14 in which it is received.

To ensure that a suitable seal is maintained between the bushing 18 and the end portion of the core rod 16 that it surrounds, an elastomeric O-ring 32 is positioned therebetween, for example, in an inwardly facing annular recess 18c in the inside diameter of the bushing 18. However, lit is also contemplated that the O-ring 32 can be positioned in an outwardly facing annular recess, not shown, in the core rod 16 to engage the inside surface of the bushing 18.

Figure 3:
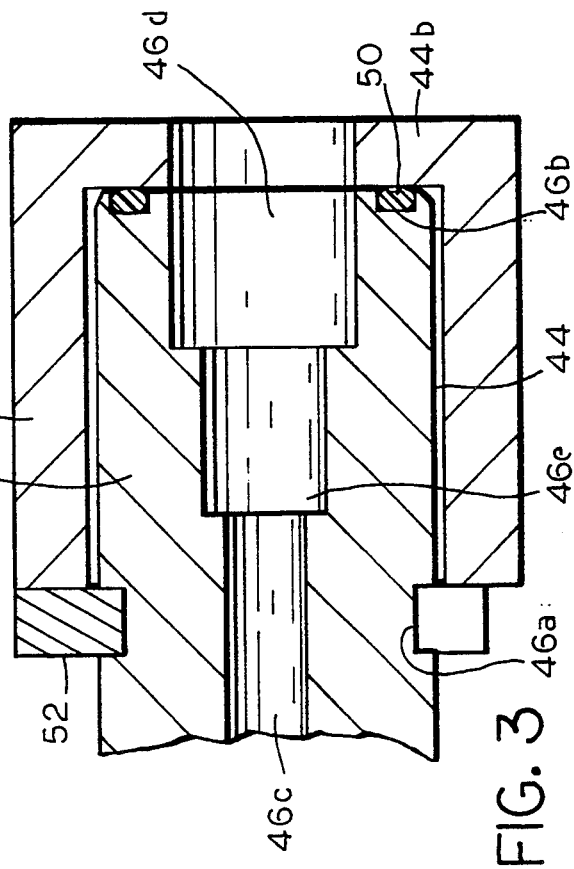
FIG. 3 is a view similar to FIG. 2 of an alternative embodiment of the present invention.

In the embodiment of FIG. 3, the reference numeral 40 is used to identify a blow molding machine face block according to an alternative embodiment of the present invention. The face block 40 has one or more openings 44 extending therethrough, and each opening 44 receives an end of an elongate tubular core rod 46. The outside diameter of the core rod 46 is somewhat less than the inside diameter of the portion of the opening 44 which surrounds it, to permit radial movement of the core rod 46 within the opening 44, that is, movement of the core rod 46 in a plane extending transversely of its longitudinal central axis.

The juncture between the core rod 46 and the opening 44 must be sealed against loss of blowing air that flows from the face block 40 through the core rod 46, and to this end an elastomeric O-ring 50 is positioned in an annular recess 46b in an end of the core rod. The O-ring 50 is positioned to sealingly engage an inturned annular flange 44b at the rear or molding machine adjacent end of the opening 44.

The O-ring 50 is maintained in sealing engagement with the flange 44b by providing the core rod 46 with an annular groove 46a in its outside surface at a location immediately in front of the face block 40 and by removably affixing a U-shaped retainer 52 to the front of the face block 40 in any desired fashion. The legs of the retainer 52 project into the groove 46a to prevent sufficient axial motion of the core rod 46 to break the seal between the O-ring 50 and the flange 44b while at the same time permitting free radial movement of the core rod 46 relative to the opening 44.

As illustrated, the core rod 46 has a multiple step internal diameter, including a small diameter portion 46c, which extends for a major portion of its length, a large diameter portion 46d at its free internal end, which is sized to correspond to the opening defined by the flange 44b, and, if necessary, a diameter 46e of intermediate size positioned between the diameter 46c portion and the diameter 46d portion to avoid the adverse fluid flow characteristics that could result if there were too sudden a change in diameter between the diameter 46c portion and the diameter 46d portion.

Figure 2:
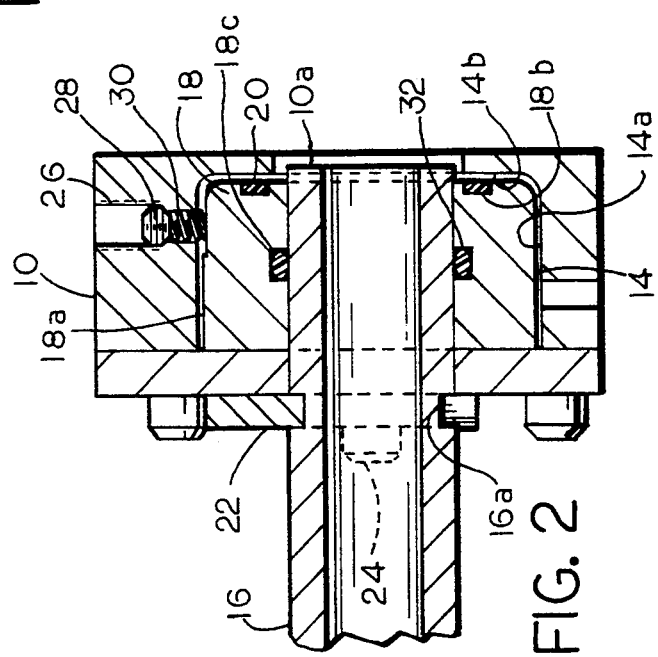
FIG. 2 is a fragmentary sectional view taken on line 2—2 of FIG. 1, at a somewhat enlarged scale with respect to FIG. 1.

Thus, the embodiment of FIG. 3 differs mainly from the embodiment of FIGS. 1 and 2 in that the embodiment of FIG. 3 eliminates the need for a bushing corresponding to the bushing 18 of the embodiment of FIGS. 1 and 2 and the need for an O-ring corresponding to the O-ring 32 of the embodiment of FIGS. 1 and 2. While not shown in FIG. 3, the embodiment of FIG. 3 can be provided with centering or positioning screws and springs corresponding to the screws 28 and springs 30 of the embodiment of FIGS. 1 and 2.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. In an apparatus for blow molding hollow thermoplastic articles, the improvement comprising:
   a face block adapted to be secured to said blow molding machine, said face block having at least one opening extending generally axially therethrough, the at least one opening having an annular flange projecting radially thereinto, said annular flange being spaced axially inwardly from a front face of the face block;
   an elongate hollow core rod having an end portion positioned within said opening of said face block, said end portion having a free end positioned adjacent said annular flange, said end portion being capable of moving, in a plane extending transversely of a longitudinal central axis of said core rod, relative to said at least one opening, said core rod having another portion extending beyond said front face of said face block;
   O-ring sealing means carried in a free end of said end portion of said core rod, said O-ring sealing means being adapted to sealingly engage said annular flange as said end portion of said core rod moves relative to said opening; and
   means for accurately positioning said core rod relative to said annular flange to maintain said O-ring sealing means in sealing engagement with said annular flange.

2. Apparatus according to claim 1 wherein said core rod comprises an annular recess in an outer surface thereof at a location in front of said front face of said face block, and wherein said means for accurately positioning comprises a retainer removably secured to said face block, said retainer having a portion projecting into said annular recess.

3. Apparatus according to claim 2 wherein said retainer is generally U-shaped, wherein said portion comprises a first leg of said retainer, and wherein said retainer further comprises a second leg, said second leg also projecting into said annular recess.

4. Apparatus according to claim 1 wherein said end portion of said core rod comprises an annular bushing secured thereto, said annular bushing having an annular groove in an end surface thereof, and wherein said O-ring sealing means is positioned in said annular groove of said annular bushing.

5. Apparatus according to claim 4 and further comprising:
   sealing means positioned between said end portion of said core rod and said annular bushing to seal against the flow of blowing air therebetween.

6. Apparatus according to claim 1 and further comprising:
   at least three circumferentially spaced apart positioning openings extending generally radially through said face block, each of said positioning openings being aligned with said end portion of said core rod; and
   a positioning means adjustably positioned in each of said positioning openings for engaging said end portion of said core rod to permit the adjustable radial positioning of said core rod relative to said opening.

7. Apparatus according to claim 6 wherein each of said positioning means comprises a resilient member at an inner free end thereof.

8. Apparatus according to claim 7 wherein said resilient member comprises a coil spring.

9. Apparatus according to claim 6 comprising at least four of said positioning openings.

10. In an apparatus for blow molding hollow thermoplastic articles, the improvement comprising:
    a face block adapted to be secured to said blow molding machine, said face block having a plurality of laterally spaced apart openings extending generally axially therethrough, each of said openings having an annular flange projecting radially thereinto, each said annular flange being spaced axially inwardly from a front face of the face block;

a plurality of elongate core rods, each core rod having an end portion positioned within one of said plurality of openings of said face block, each said end portion having a free end positioned adjacent the annular flange of the opening in which said end portion is positioned, each said end portion being capable of moving, in a plane extending transversely of a longitudinal central axis of said core rod, relative to the opening in which said end portion is received, each said core rod further having another portion extending beyond said front face of said face block;

a plurality of O-ring sealing means, each said O-ring sealing means being carried in a free end of an end portion of one of said core rods, each said O-ring sealing means being adapted to sealingly engage the annular flange of the opening in which said end portion is received as said end portion moves relative to said opening; and means for accurately positioning each of said core rods relative to the annular flange of the opening in which the end portion of said core rod is positioned to maintain the O-ring sealing means carried by said annular flange in sealing engagement with said annular flange.

11. Apparatus according to claim 10 wherein each of said core rods comprises an annular recess in an outer surface thereof at a location in front of said front face of said face block, and wherein said means for accurately positioning comprises retainer means removably secured to said face block, said retainer means having means extending into said annular recess of each of said core rods.

12. Apparatus according to claim 11 wherein said retainer means comprises a plurality of individual retainers, each of said retainers being removably secured to said face block and having a portion projecting into an annular recess of one of said core rods.

13. Apparatus according to claim 11 wherein each of said retainers is generally U-shaped, wherein said portion of said each of said retainers comprises a first leg of said each of said retainers, and wherein each of said retainers further comprises a second leg, said second leg of said each of said retainers also projecting into the annular recess of said one of said core rods.

14. Apparatus according to claim 10 wherein said end portion of each of said core rods comprises an annular bushing secured thereto, said annular bushing having an annular groove in an end surface thereof, and wherein each of said O-ring sealing means is positioned in an annular groove of one of said annular bushings.

15. Apparatus according to claim 14 and further comprising:

sealing means positioned between each of said end portions of said core rods and the annular bushing that is secured thereto to seal against the flow of blowing air therebetween.

16. Apparatus according to claim 10 and further comprising;

at least three circumferentially spaced apart positioning openings extending generally radially through said face block surrounding each of said openings, each of said positioning openings that surrounds said one of said openings being aligned with the end portion of the core rod that is positioned within said one of said openings; and a positioning means adjustably positioned in each of said positioning openings for engaging said end portion of said core rod to permit the adjustable radial positioning of said core rod relative to said opening.

17. Apparatus according to claim 16 wherein each of said positioning means comprises a resilient member at an inner free end thereof.

18. Apparatus according to claim 17 wherein said resilient member comprises a coil spring.

19. Apparatus according to claim 16 comprising at least four of said positioning openings.

* * * * *